(12) United States Patent
Schmidt (10) Patent No.: US 11,407,502 B2
(45) Date of Patent: Aug. 9, 2022

(54) TAXI DRIVE SYSTEM FOR AIRCRAFT

(71) Applicant: Safran Landing Systems Canada Inc., Ajax (CA)

(72) Inventor: Robert Kyle Schmidt, Brooklin (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 346 days.

(21) Appl. No.: 16/799,361

(22) Filed: Feb. 24, 2020

(65) Prior Publication Data

US 2021/0261243 A1  Aug. 26, 2021

(51) Int. Cl.
*B64C 25/40* (2006.01)
(52) U.S. Cl.
CPC ................... *B64C 25/405* (2013.01)
(58) Field of Classification Search
CPC ..................................................... B64C 25/405
USPC ....................................................... 244/103 R
See application file for complete search history.

(56) References Cited

U.S. PATENT DOCUMENTS

| | | | | |
|---|---|---|---|---|
| 2,472,641 | A * | 6/1949 | Wood | B64C 25/38 |
| | | | | 244/103 S |
| 2,521,864 | A * | 9/1950 | Morse | B64C 25/405 |
| | | | | 244/103 S |
| 2,782,076 | A * | 2/1957 | Miller | B62D 49/0621 |
| | | | | 305/20 |
| 3,762,670 | A | 10/1973 | Chillson | |
| 4,596,300 | A * | 6/1986 | Mankey | B62D 59/04 |
| | | | | 180/343 |
| 9,359,068 | B2 * | 6/2016 | Oswald | B64C 5/02 |
| 2007/0042854 | A1 * | 2/2007 | Edelson | F16H 3/56 |
| | | | | 475/149 |
| 2013/0026284 | A1 * | 1/2013 | Christensen | B64C 25/405 |
| | | | | 244/50 |
| 2014/0187370 | A1 | 7/2014 | Walsh | |
| 2015/0097077 | A1 * | 4/2015 | Himmelmann | B64C 25/405 |
| | | | | 244/50 |
| 2016/0214708 | A1 * | 7/2016 | Martin | B64C 25/36 |
| 2016/0214709 | A1 | 7/2016 | Rodrgues et al. | |

(Continued)

FOREIGN PATENT DOCUMENTS

| | | | | |
|---|---|---|---|---|
| EP | 2551192 A2 * | 1/2013 | ........... | B64C 25/405 |
| EP | 2749494 A2 * | 7/2014 | ........... | B64C 25/405 |

(Continued)

OTHER PUBLICATIONS

Written Opinion of the International Searching Authority and International Search Report dated May 18, 2021, issued in corresponding International Application No. PCT/CA2021/050197, filed Feb. 19, 2021, 9 pages.

*Primary Examiner* — Christopher P Ellis
(74) *Attorney, Agent, or Firm* — Christensen O'Connor Johnson Kindness PLLC (57) ABSTRACT

A taxi drive system is disclosed that provides motive force to wheels of an aircraft. The motive force is transferred by a motor powered continuous track (e.g., belt, chain, or other flexible transmission element) directly to the wheel(s) of an aircraft. The system is carried by the landing gear of the aircraft, and is placed in engagement with an aircraft wheel with sufficient force to allow for the track to drive the aircraft wheel. The taxi drive system includes a separate motor from the main aircraft engines so that the aircraft may be taxied while the main engines are shutdown or at idle.

19 Claims, 8 Drawing Sheets

(56) References Cited

U.S. PATENT DOCUMENTS

| | | | |
|---|---|---|---|
| 2019/0389567 A1* | 12/2019 | Bellenger | B64C 25/36 |
| 2020/0072317 A1* | 3/2020 | Fraim | F16H 1/06 |
| 2020/0148339 A1* | 5/2020 | Liegeois | B64C 25/26 |
| 2020/0180753 A1* | 6/2020 | Boissard | B64C 25/34 |

FOREIGN PATENT DOCUMENTS

| | | | | |
|---|---|---|---|---|
| EP | 3002213 A1 * | 4/2016 | | B64C 25/10 |
| EP | 3048043 A1 * | 7/2016 | | B64C 25/34 |
| EP | 3476727 A1 * | 5/2019 | | B64C 25/20 |
| EP | 3671393 A1 * | 6/2020 | | B64C 19/02 |
| FR | 3031962 A1 * | 7/2016 | | B64C 25/36 |
| FR | 3061137 A1 * | 6/2018 | | |
| GB | 2524092 A * | 9/2015 | | B64C 25/34 |
| WO | WO-2018121804 A1 * | 7/2018 | | B64C 25/405 |
| WO | WO-2021250169 A1 * | 12/2021 | | |

\* cited by examiner

TAXI DRIVE SYSTEM FOR AIRCRAFT

BACKGROUND

Most aircraft are equipped with landing gear enabling the aircraft to travel on the ground during takeoff, landing, and taxiing phases. These landing gear comprise a plurality of wheels, which may be arranged according to configurations varying from one aircraft to another.

In the interests of terminal noise reductions, fuel burn reduction, and commensurate $CO_2$ emissions reduction, it is desirable to power the wheels of an aircraft landing gear while the aircraft is on the ground, in order to permit the pushback and taxiing of the aircraft without use of the main propulsion engines. This concept, sometimes referred to as a taxi drive system or e-taxi system, has been discussed and attempted for many years without success, mainly due to the difficulty of achieving an appropriate way for efficient delivery of torque to the aircraft wheel assembly.

One known taxi drive system, which is set forth in US Patent Publication No. 2016/0214709, and assigned to Safran Landing Systems, employs a drive actuator that powers via a chain drive a pair of small rollers in rotation against a drive track associated with the aircraft wheel. Other configurations have been proposed. However, these solutions are often plagued by excessive normal forces against the wheel, undesirable heat generation, wheel deformation, etc.

Accordingly, there is a continuing need in the industry for taxi drive systems that result in less wheel deformation and heat generation, and that impart lower normal forces on the aircraft wheel.

SUMMARY

The present disclosure proposes a solution that utilizes a driven flexible transmission element (e.g., belt, chain, etc.) for transferring the driving torque of a motor to the aircraft wheel via direct engagement. The direct contact between the flexible transmission element and the wheel in accordance with technologies and methodologies of the present disclosure provides a reduction in the required contact force against the wheel and the reduction or elimination of issues of previously proposed systems.

In accordance with an aspect of the present disclosure, an aircraft landing gear is provided. In an embodiment, the aircraft landing gear comprises a landing gear leg that includes a first end, an aircraft wheel rotatably mounted at the first end about an axis, and a taxi drive system configured to apply a motive force to the aircraft wheel. In an embodiment, the taxi drive system comprises a carriage movably mounted to the landing gear leg at a position spaced from the first end, drive pulley carried by the carriage, first and second positioning pulleys carried by the carriage; and a drive belt disposed in tension between the drive pulley and the positioning pulleys to form a continuous track. The aircraft landing gear further includes an actuator coupled between the landing gear leg and the carriage. The actuator is configured to move the carriage between a first position, in which a segment of the continuous track is in engagement with the wheel, and a second position, in which the segment of the continuous track is removed from engagement with the wheel.

In any of the embodiments described herein, the landing gear leg includes an outer cylinder and a piston telescopically within the outer cylinder.

In any of the embodiments described herein, the taxi drive system is carried by the outer cylinder and the aircraft wheel is carried by the piston.

In any of the embodiments described herein, the taxi drive system and the aircraft wheel are carried by the piston.

In any of the embodiments described herein, the aircraft wheel includes a hub that supports an aircraft tire.

In any of the embodiment described herein, the taxi drive system is configured to apply a motive force to the aircraft tire. For example, in an embodiment, the segment of the continuous track is in engagement with the aircraft tire in the first position.

In any of the embodiment described herein, the taxi drive system is configured to apply a motive force to the aircraft hub. For example, in an embodiment, the segment of the continuous track is in engagement with the aircraft hub in the first position.

In any of the embodiments described herein, the drive belt is made of a rubber material.

In any of the embodiments described herein, the drive belt includes substantially the same material as the aircraft tire.

In any of the embodiments described herein, the segment of the continuous track engages with the aircraft tire to form a circumferential contact patch, the circumferential contact patch extending approximately 5% and 40% of the circumference of the aircraft tire.

In any of the embodiments described herein, the circumferential contact patch extends approximately 15% of the circumference of the aircraft tire.

In any of the embodiments described herein, the drive belt has a width of approximately 40-100 mm.

In any of the embodiments described herein, the drive belt has a width of approximately 55-65 mm.

In any of the embodiments described herein, the taxi drive system further comprises a take-up pulley in contact with the drive belt.

In any of the embodiments described herein, the take-up pulley is a self-adjusting take-up pulley.

In any of the embodiments described herein, the drive pulley and the positioning pulleys are fixed with respect to carriage, and the take-up pulley is movable with respect to the carriage.

In any of the embodiments described herein, the carriage is movably mounted to the landing gear via a linkage mechanism.

In any of the embodiments described herein, the linkage mechanism forms a 4-bar linkage with the landing gear leg and carriage.

In any of the embodiments described herein, the actuator includes a linear actuator configured to hold the continuous track against the aircraft wheel.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Language such as, but not limited to, "top surface", "bottom surface", "side, edge", "vertical", "horizontal", and "lateral" in the present disclosure is meant to provide orientation for the reader with reference to the drawings and is not intended to be the required orientation of the components or to impart orientation limitations into the claims.

The present disclosure relates to aircraft taxi drive systems that can be used to propel an aircraft on the ground, e.g., to taxi the aircraft on the ground from one point to another. The Examples of the aircraft taxi drive system are carried by the aircraft and includes a motor that is separate from the main engines (e.g., jet engines) of the aircraft, such that the propulsion of the aircraft during taxiing is independent of the main engines used during flight. In other words, the main engines provide the thrust required during take-off and landing of the aircraft and during flight, whereas the motor of the taxi drive system is configured to provide a motive force, for example, to one or more aircraft wheels for rotation thereof during taxiing.

The present disclosure describes example taxi drive systems that provide motive force to wheels of an aircraft. In an example according to technologies and methodologies of the present disclosure, the motive force is transferred by a motor powered continuous track (e.g., belt, chain, or other flexible transmission element) directly to the wheel(s) of an aircraft. The system is carried by the landing gear of the aircraft, and is placed in engagement with an aircraft wheel with sufficient force to allow for the track to drive the aircraft wheel.

In examples described herein, the taxi drive system increases the contact area between the drive element and the aircraft wheel as compared to conventional designs, resulting in lower normal forces against the aircraft wheel, less heat generation, etc. In some examples, the taxi drive system is configured to create a large contact patch between the continuous track and the aircraft wheel, allowing for a lower normal force requirement, less wheel deformation, and less heat generation. Because the example taxi drive systems have a separate motor, the aircraft may be taxied while the main engines are shutdown or at idle.

The examples of the taxi drive system described herein are also configured to engage and disengage with the aircraft wheels, e.g., by rotation or translation of the taxi drive system or components thereof between a first position, in which the taxi drive system is engaged with the aircraft wheel, and a second position, in which the taxi drive system is disengaged from the aircraft wheel. In some examples that employ a continuous track formed by a flexible transmission element, such as a belt or chain, the outer surface of the track is arranged to engage the aircraft wheel to transfer torque to the aircraft wheels when the system is in the first position. By using the exterior of the track, the track can be easily engaged or disengaged from the aircraft wheel (e.g., moved between the first and second positions).

In some embodiments, examples of the taxi drive systems described herein are able to engage or disengage as a unit via rotational and/or translational movement of the taxi drive system. In an embodiment to be described below, a 4-bar linkage or similar mechanism is employed to move the taxi drive system as a unit from the disengaged position to the engaged position and back to the disengaged position. Of course, in other embodiments, the positions of one or more of the taxi drive system can remain fixed while other components of the taxi drive system are movable to provide engagement or disengagement with the aircraft wheel.

Figure 1A:
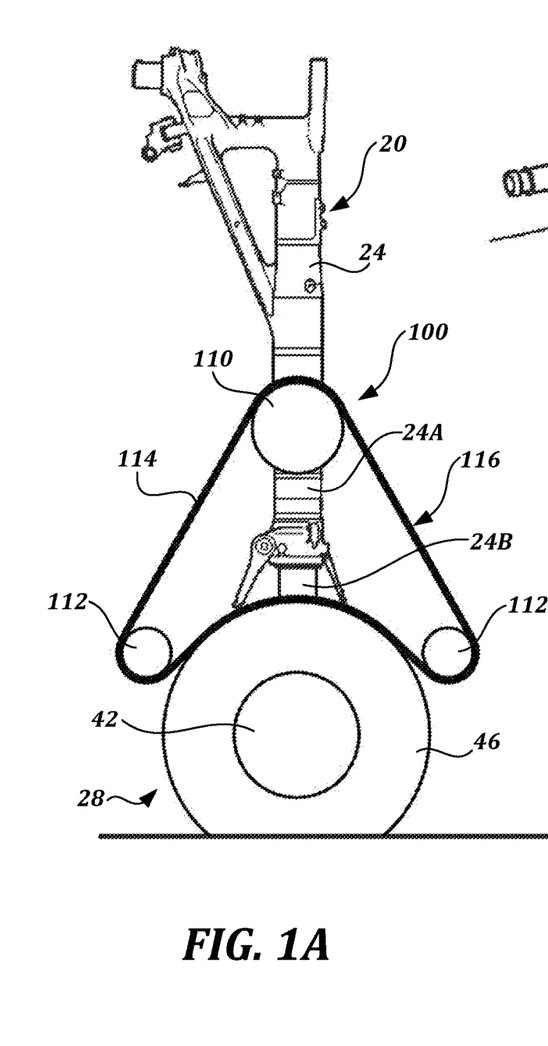
FIGS. 1A and 1B are side and front schematic views of an example of an aircraft landing gear system equipped with an example of a taxi drive system, the taxi drive system being in the first or wheel-engaged position.
Figure 1B:
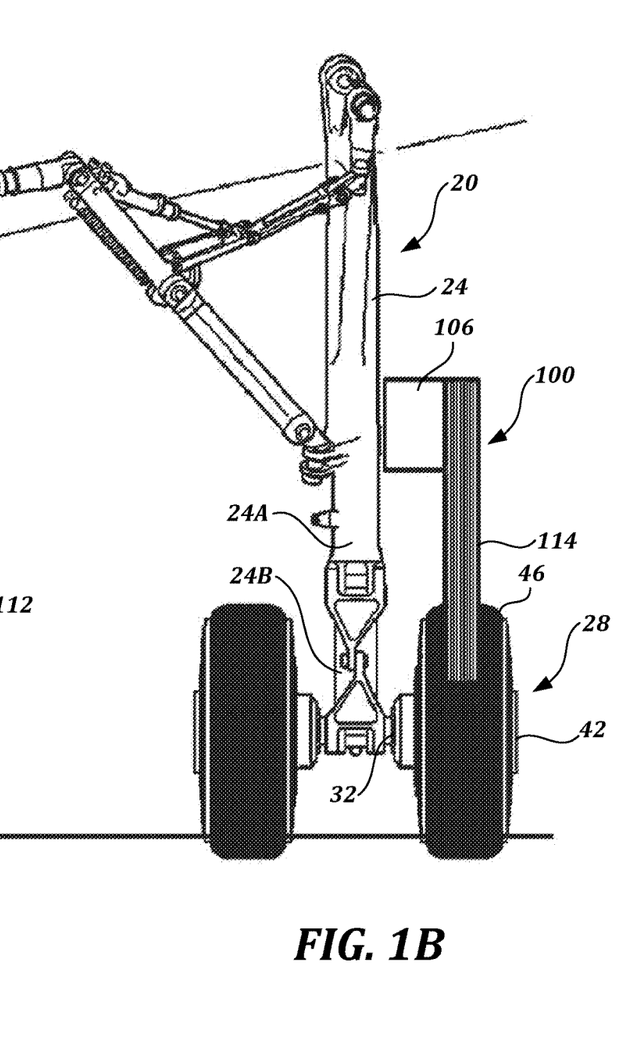

FIGS. 1A and 1B are side and front schematic views illustrating an example of an aircraft landing gear assembly 20 equipped with an example of a taxi drive system 100. In the example shown in FIGS. 1A and 1B, the landing gear assembly 20 comprises a landing gear leg 24, such as a landing gear strut leg, and one or more aircraft wheels 28 mounted for rotational movement about an axle 32. The axle 32 is suitably connected to the lower end of landing gear leg 24. In the embodiment shown, each wheel 28 includes a hub 42 that supports an aircraft tire 46. As will be described in more detail below, the taxi drive system 100 provides a motive force to one or more wheels 28 of the aircraft landing gear assembly 20 to enable the aircraft to taxi without propulsion from the main engines.

An aircraft may be equipped with one or more landing gear assemblies 20, which can include one or more respective taxi drive systems 100 (e.g., one taxi drive system per landing gear assembly or per wheel of a landing gear assembly). In other examples, only a subset of the landing gear assemblies 20 of an aircraft may be equipped with a respective taxi drive system 100. Two aircraft wheels 28 are shown in the example configuration of the landing gear assembly 20 of FIGS. 1A and 1B. The landing gear assembly 20 may be equipped with one wheel 28 or more than three aircraft wheels 28 in other examples.

An example of a taxi drive system 100 will now be described in more detail with respect to FIGS. 1A, 1B, 2A, 2B, and 3. As shown in FIGS. 1A, 1B, the taxi drive system 100 is a power transmission system that includes a drive motor 106, one or more pulley(s), including a drive pulley 110 and positioning pulley(s) 112, and a flexible transmission element in the form of a drive belt 114. In the example depicted in FIGS. 1A, 1B and 3, the drive motor 106 is configured to provide the motive force of the taxi drive system 100 by rotating the drive pulley 110. The drive pulley 110 is engaged with the drive belt 114, which loops around the drive pulley 110 and the one or more positioning pulleys 112 to form a continuous track 116 (or "track 116"). As the drive pulley 110 rotates, the belt 114 also moves, causing the continuous track to move about the pulleys 110, 112.

Figure 2A:
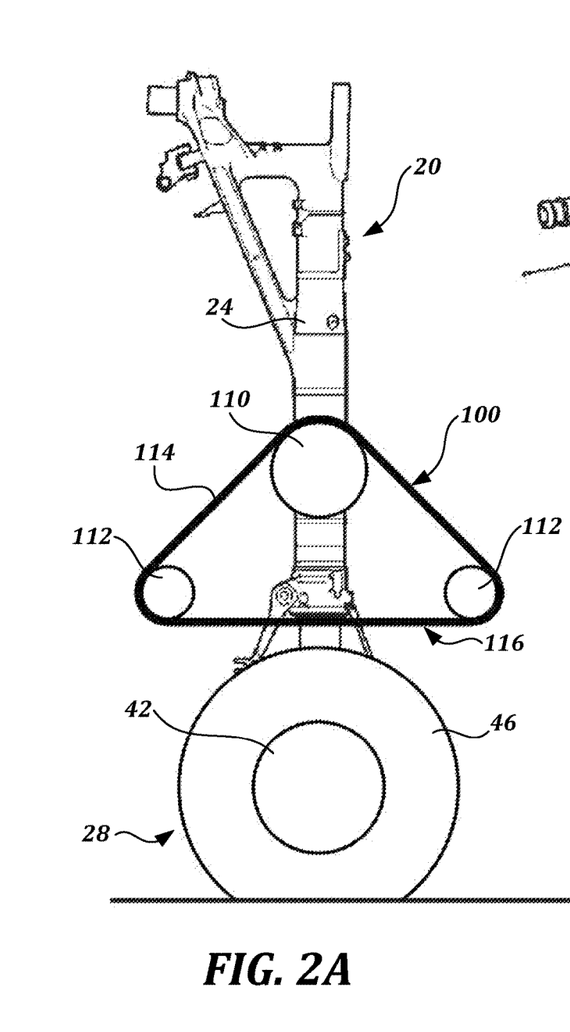
FIGS. 2A and 2B are side and front schematic views of an example of an aircraft landing gear system equipped with an example of a taxi drive system, the taxi drive system being in the second or wheel-disengaged position.
Figure 2B:
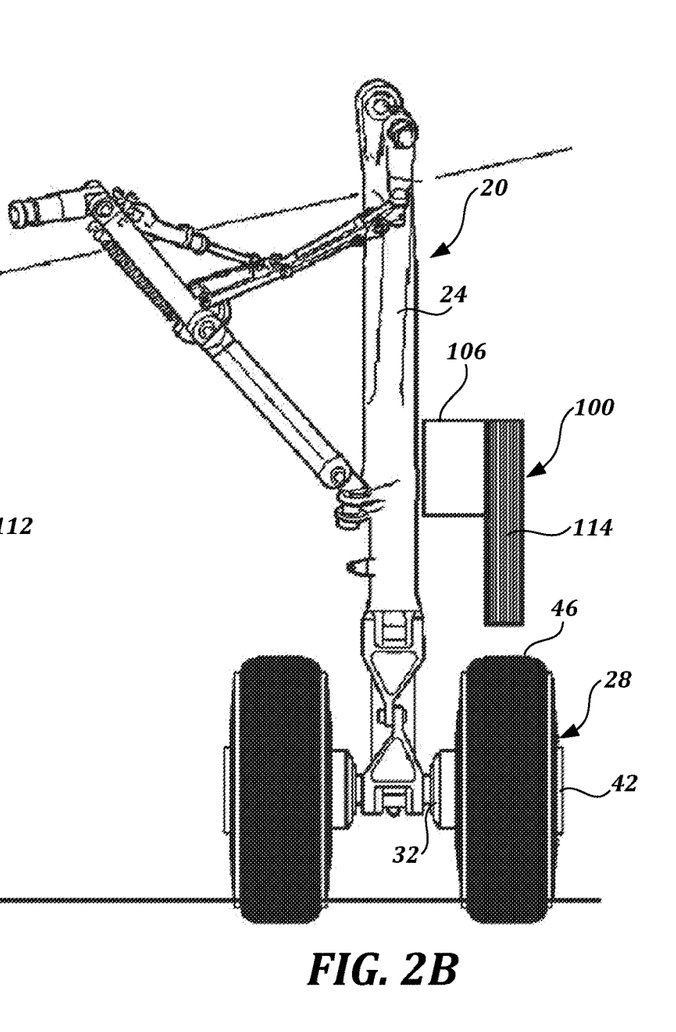

When the taxi drive system 100 is in a first position, as shown in FIGS. 1A, 1B, the exterior of the track 116 is in frictional contact with the aircraft wheel 28, for example the aircraft tire 46. Thus, the torque generated by the drive motor 106 is transferred to the aircraft wheel 28 by the track 116, causing the aircraft to taxi. As will be described in more detail below, when the taxi drive system 100 is not being used to taxi the aircraft, the taxi drive system or components thereof, can be moved to a second position, in which the taxi drive system 100, for example the track 116, is in a wheel-disengaged position, as shown in FIGS. 2A, 2B.

In the embodiment shown in FIGS. 1A-2A, the taxi drive system 100 is carried by the leg 24 of landing gear assembly 20. In an embodiment, the leg 24 includes an oleo strut comprising an outer cylinder 24A and a piston 24B telescopingly movable with respect to the outer cylinder 24A. In some of these embodiments, the taxi drive system 100 is carried by the outer cylinder 24A and the aircraft wheel 28 is carried by the piston 24B. As such, the second position of the taxi drive system 100 described above can be variable, for example, based on the weight of the aircraft, bumps incurred during taxiing, etc. In other embodiments, the taxi drive system 100 and the aircraft wheel(s) 28 can be carried by the piston 24B (e.g., beside or between aircraft wheels 28). Thus, in these embodiments, the second position of the taxi drive system 100 described above can be fixed, for example.

The drive motor 106 is configured to generate torque that can be used to propel the aircraft when the aircraft is on the ground, i.e., to taxi the aircraft. The drive motor 106 can be powered using any suitable source. In some examples, the drive motor 106 may comprise or consist of an electric motor. Power for an electric motor may be drawn from any suitable source, such as directly from the electrical system of the aircraft, e.g., the auxiliary power unit (APU) of the aircraft, and routed along landing gear assembly 20, or from a battery or other power storage source of the aircraft. In other embodiments, the drive motor 106 may be a hydraulic motor powered by, for example, the hydraulic system of the aircraft. Other configurations are possible. For example, the taxi drive system 100 may include an independent electrical or hydraulic source located on landing gear assembly 100 or the fuselage of the aircraft.

In some examples, the drive motor 106 may include or be associated with a transmission or gear box, which may help increase the torque outputted by the drive motor 106 to the drive pulley 110. The gear ratio in the gearbox or transmission may be fixed or selectable, e.g., via crew member input, etc. Other methods of increasing the torque of the taxi drive system may also be employed, such as providing a drive pulley 110 with a smaller diameter than the positioning pulleys. In other embodiments, drive pulleys with variable diameters can be used to vary the speed and/or torque provided by the drive motor 106.

In some examples, the rotation rate of the drive motor 106, and, therefore, the rate at which aircraft wheel 28 is rotated by the drive motor 106, may be also controlled by crew member input. For example, if the drive motor 106 comprises an electric motor, a crew member of the aircraft may control the rotation rate of the drive motor 106, and speed of the taxiing aircraft, by varying the voltage or current supplied to the drive motor 106. The drive motor 106 may be used to taxi in reverse by reversing the polarity of the voltage or current supplied to the drive motor 106. In some embodiments, the drive motor is computer controlled.

As was described in brief detail above, the continuous track 116 of drive belt 114 transmits the torque generated by the drive motor 106 (and supplied to the drive pulley) to the aircraft wheel(s) 28. The drive belt 114 in some embodiments can be a rubber or reinforced rubber belt. In some embodiments, the reinforced rubber belt includes reinforcing plies of steel or high modulus materials that resist tensile forces applied to the rubber belt. In some embodiments, the rubber selected to form the drive belt 114 can be the same or similar rubber as the aircraft tire 46. In an embodiments, the rubber selected to form the drive belt 114 can be substantially similar as the rubber of the aircraft tire 46. In some embodiments, the drive belt 114 is approximately 40-100 mm wide and between approximately 5-15 mm thick. In some embodiments, the drive belt 114 is approximately 55-65 mm wide, and is about 60 mm in an embodiment. Of course, other widths and thicknesses are possible, and will depend on the attended application, such as aircraft wheel sizes, aircraft weight, etc. In an embodiment, the aircraft tire can be a 46×17R20 aircraft tire.

In some embodiments, the interface between the drive belt 114 and the drive pulley 110 is purely frictional, and thus, the drive belt can have a somewhat smooth or lightly textured interior surface. In these embodiments, the drive pulley 110 may include a somewhat smooth or lightly textured drive surface for interfacing with drive belt 114. In other embodiments that require increased torque transfer, the interior surface of the drive belt can include molded grooves, teeth, etc. In these embodiments, the drive pulley 110 may include cooperating structure (e.g., grooves, teeth, etc.) for interfacing with the drive belt 114. In some embodiments, torque transmission from the track 116 to the aircraft wheel 28, for example the aircraft tire 46, is purely frictional. Accordingly, the exterior surface of the drive belt 114 may be smooth. If an increase in friction is desired, especially in all weather conditions, the exterior surface of the drive belt 114 may be configured with suitable tread forms or sipes in other embodiments.

In the embodiment shown, the exterior surface of the track 116 contacts a circumferential section of the aircraft wheel. This circumferential contact area can be revered to as the "circumferential coverage" or "circumferential contact patch" between the track 116 and the aircraft wheel 28. In some embodiments, the circumferential contact patch of the track 116 is approximately between 5% and 40% of the circumference of the aircraft wheel 28, e.g., the aircraft tire 46. Circumferential contact patches in this range provide reduced normal forces against the aircraft tire 46 while providing a suitable frictional efficiency and minimal distortion of the tire carcass. In an embodiment of the present disclosure, the circumferential contact patch of the track 116 is approximately one quarter of the circumference of the aircraft wheel 28, e.g., the aircraft tire 46. In another embodiment of the present disclosure, the circumferential contact patch of the track 116 is approximately 15% of the circumference of the aircraft wheel 28, e.g., the aircraft tire 46. While the track 116 is shown in engagement with the aircraft tire 46 in illustrated embodiments, the track 116 may also contact a suitable contact surface (e.g., crown track, etc.) on hub 42 to taxi the aircraft.

In the embodiment of FIGS. 1A, 1B, and 2A, 2B, positioning pulleys 112 are generally used to position the track 116 into engagement with the aircraft wheel 28 in the first position shown in FIGS. 1A, 1B, and to maintain tension in the track 116 in the second position shown in FIGS. 2A, 2B. In some embodiments, the size of the circumferential contact patch is dependent in part on the location of the positioning wheels 112. In some embodiments, the range is adjustable while in other embodiments the range is fixed.

Figure 3:
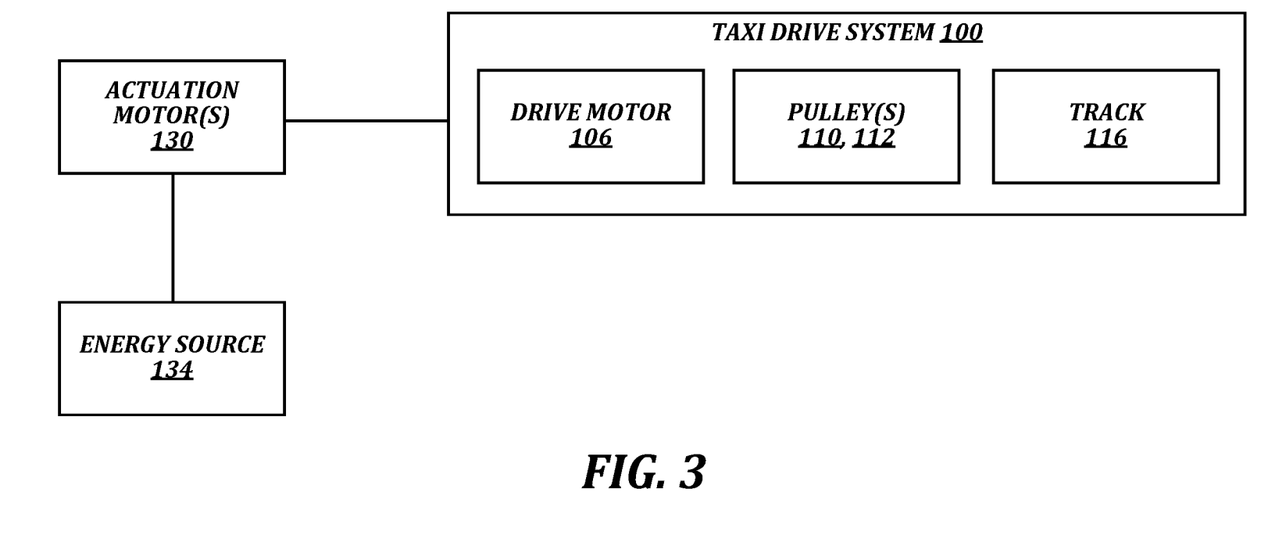
FIG. 3 is a block diagram of an example of an aircraft taxiing system in accordance with an embodiment of the present disclosure.

To increase the efficiency of the frictional interface between the track 116 and the aircraft wheel 28, an actuation system may be provided to either hold the track 116 in engagement with the aircraft wheel 28 or to increase the force against the aircraft wheel 28. In one embodiment, the actuation system may include one or more actuation motors 130 connected to an energy source 134, as shown in FIG. 3, to hold or force the track 116 against the aircraft wheel 28. In some embodiments, the energy source 134 also provides energy to the drive motor 106 of the taxi drive system 100 described above.

This actuation system may also be used to remove the taxi drive system 100, for example the track 116, from engagement with the aircraft wheel 28. For example, when the taxi drive system is not being used to taxi the aircraft, the taxi drive system or components thereof, are moved to a second position, in which the taxi drive system 100, for example, the track 116, is in a wheel-disengaged position, as shown in FIGS. 2A, 2B.

In some embodiments, one or more components are movable to engage or disengage with the aircraft wheel. For example, in the embodiment of FIGS. 1A, 1B, and 2A, 2B, the pulleys 110 and drive motor 106 are fixed in position with regard to the landing gear leg. On the other hand, the positioning pulleys 112 can be moved (e.g., rotated, translated, etc.) via the actuation system between the position shown in FIGS. 1A, 1B, in which the track 116 is in engagement with the aircraft wheel, and the position shown in FIGS. 2A, 2B, in which the track 116 is not in engagement (e.g., disengaged) with the aircraft wheel. In other embodiments, the taxi drive system 100 is able to move as a unit from the disengaged position to the engaged position and back to the disengaged position. In other words, the taxi drive system 100 engages or disengages with the aircraft wheel 28 as a unit. An example of such an arrangement will be described below with reference to FIGS. 5-8.

In the embodiment shown in FIG. 3, the actuation system is composed of one or more actuation motors 130 and an energy source 134. In an embodiment, the actuator motor 130 can include an electric motor, a hydraulic motor, etc., and can be powered using any suitable source, such as energy source 134. In some embodiments, actuation motors 130 may be electric motors that rotate and/or translate the positioning pulleys 112 such that the track 116 reciprocally moves between the first or wheel-engaged position and the second or wheel-disengaged position. In other embodiments, the actuator motor(s) 130 may be a hydraulic actuator or lead screw actuator that cause movement of the track 116 via associated linkage members.

The energy source 134 can include, for example, the electrical system of the aircraft, e.g., the auxiliary power unit (APU) of the aircraft, a battery or other power storage source for the aircraft, etc., or the hydraulic system of the aircraft. In other configurations, the taxi drive system 100 may have an independent electricity or pressurized hydraulic fluid source located on the landing gear assembly 20 or the fuselage of the aircraft. In some embodiments, the energy source 134 also provides energy to the drive motor 106 of the taxi drive system 100 described above.

In some embodiments, the actuation motor 130 can be coupled either mechanically/hydraulically or through computer control such that the normal force applied by the continuous track on the aircraft wheel (e.g., aircraft tire) is proportional to the torque generated by the drive motor 106. For example, in an embodiment, the drive motor 106 is a pressure controlled hydraulic motor, the actuation motor 130 is a linear hydraulic actuator, and the hydraulic source, such as energy source 134, is suitable arranged to supply hydraulic fluid to both the drive motor 106 and the actuation motor 130 such that more pressure supplied by the hydraulic source results in more torque output from the drive motor 106 and a greater normal force applied against the aircraft wheel via the actuation motor 130.

Figure 4A:
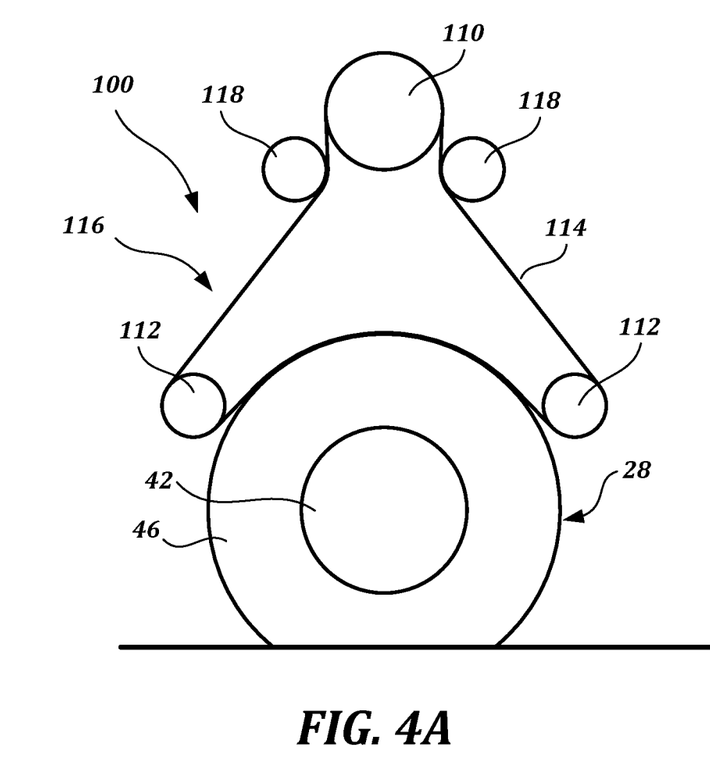
FIGS. 4A and 4B are side schematic views of another example of a taxi drive system in accordance with the present disclosure, wherein the taxi drive system is in the first or wheel-engaged position in FIG. 4A and in the second or wheel-disengaged position in FIG. 4B.
Figure 4B:
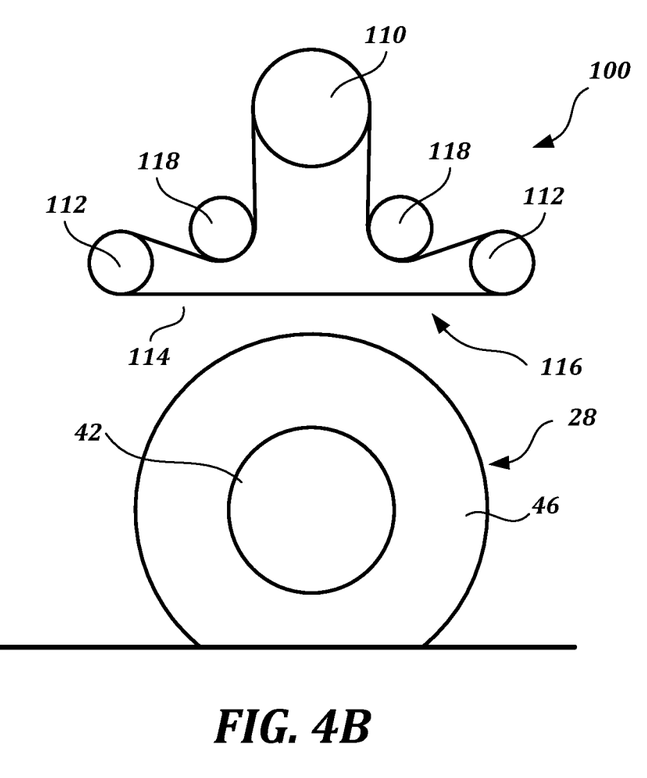

Additional pulleys, such as take-up pulleys 118, sometimes referred to as belt tensioners, can be optionally provided in some embodiments, as shown FIGS. 4A, 4B. Take-up pulleys 118 are generally used to tension the drive belt 114, and shape the path the drive belt 114. Shaping the path of the belt 114 allows for increased contact with the drive pulley 110 and positioning pulleys 112, thereby increasing friction and allowing better transfer of torque from the drive pulley 110 to the drive belt without slippage. In some embodiments, the take-up pulleys 118 can be of the self-adjusting or self-tensioning type. In other embodiments, the take-up pulleys 118 can be arranged to provide a pre-tension force against the drive belt 114.

Turning now to FIGS. 5-8, there is shown another example of the taxi drive system 400 in accordance with an embodiment of the present disclosure. The illustrated taxi drive system 400 is similar to the taxi drive system 100 shown in FIGS. 1A, 1B, and 2A, 2B, wherein components of the taxi drive system joint shown in FIG. 4 that are labeled with reference number 4XX correspond to similar components labeled with reference number 1XX in FIGS. 1A, 1B and 2A, 2B, except as noted. For example, the drive belt 414 in FIG. 4 is similar to the drive belt 114 shown in FIGS. 1A, 1B and 2A, 2B unless otherwise described.

Figure 5:
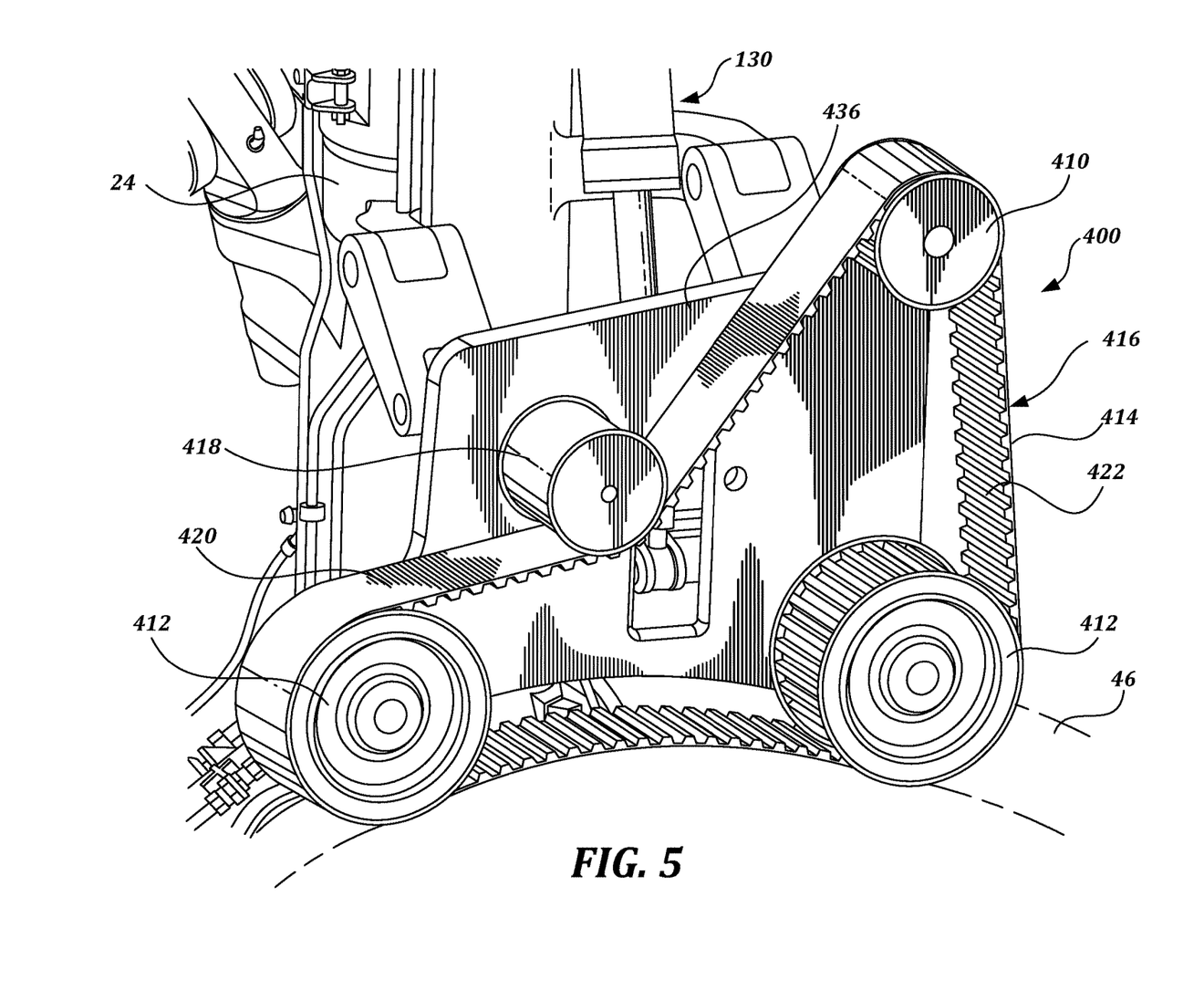
FIG. 5 is a front perspective view of another example of a taxi drive system in accordance with the present disclosure, the taxi drive system mounted to an example of a landing gear.
Figure 6:
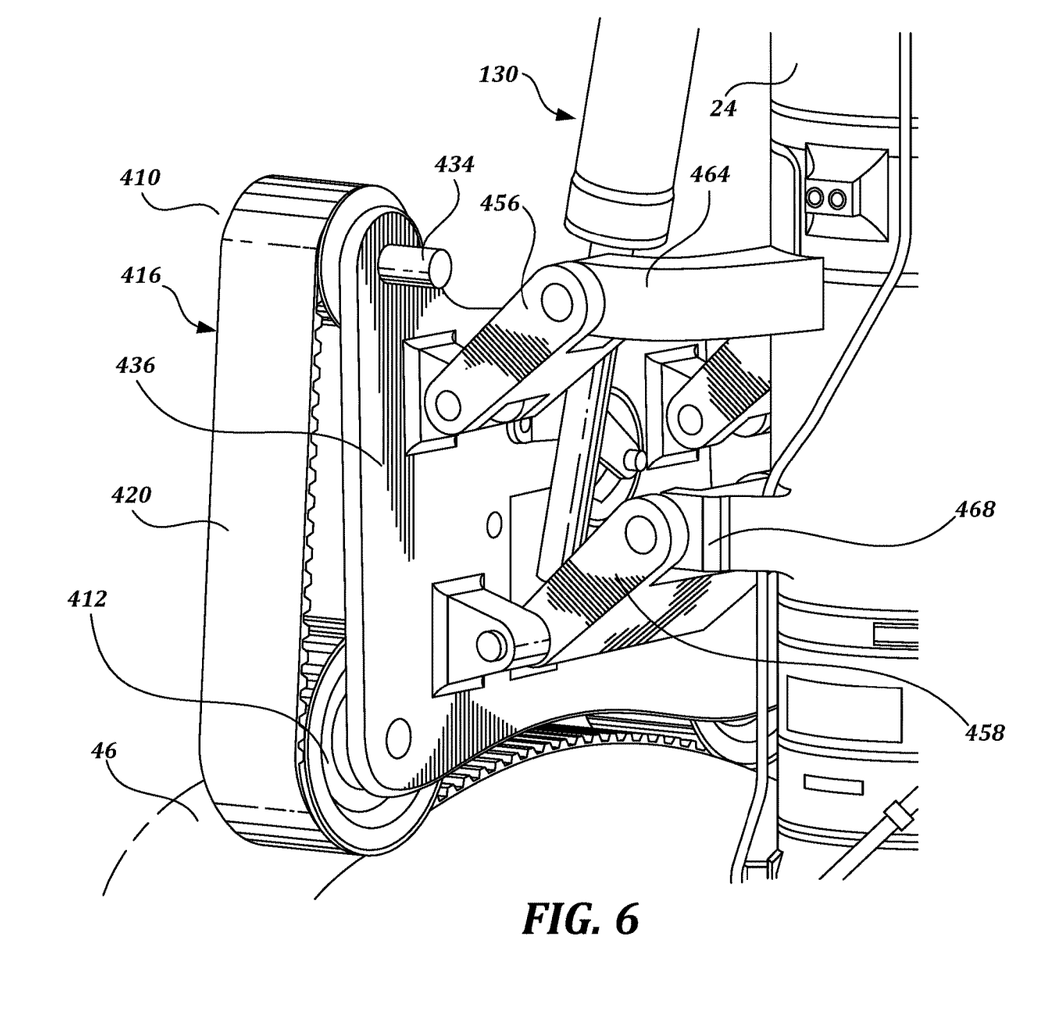
FIG. 6 is a rear perspective view of the taxi drive system of FIG. 5 with the taxi drive system in the first or wheel-engaged position.

As shown in FIGS. 5 and 6, the taxi drive system 400 includes one or more pulley(s), including a drive pulley 410 and positioning pulley(s) 412, and a flexible transmission element in the form of a drive belt 414. In the embodiment shown, the drive belt 412 has a somewhat smooth or lightly textured exterior surface 420 and an interior surface 422 formed with molded grooves, teeth, etc. As shown in FIG. 6, the drive pulley includes a drive shaft 434, which is adapted to be coupled to a drive motor, such as drive motor 106 (FIG. 3). In the embodiment shown, a take-up pulley 418 is also provided. Similar to taxi drive system 100, the drive motor is configured to provide the motive force of the taxi drive system 400 by rotating the drive pulley 410. The drive pulley 410 is engaged with the drive belt 414, which loops around the drive pulley 410 and the one or more positioning pulleys 412 to form a continuous track 416 (or "track 416"). As the drive pulley 410 rotates, the track 416 of drive belt 414 also moves.

Figure 7:
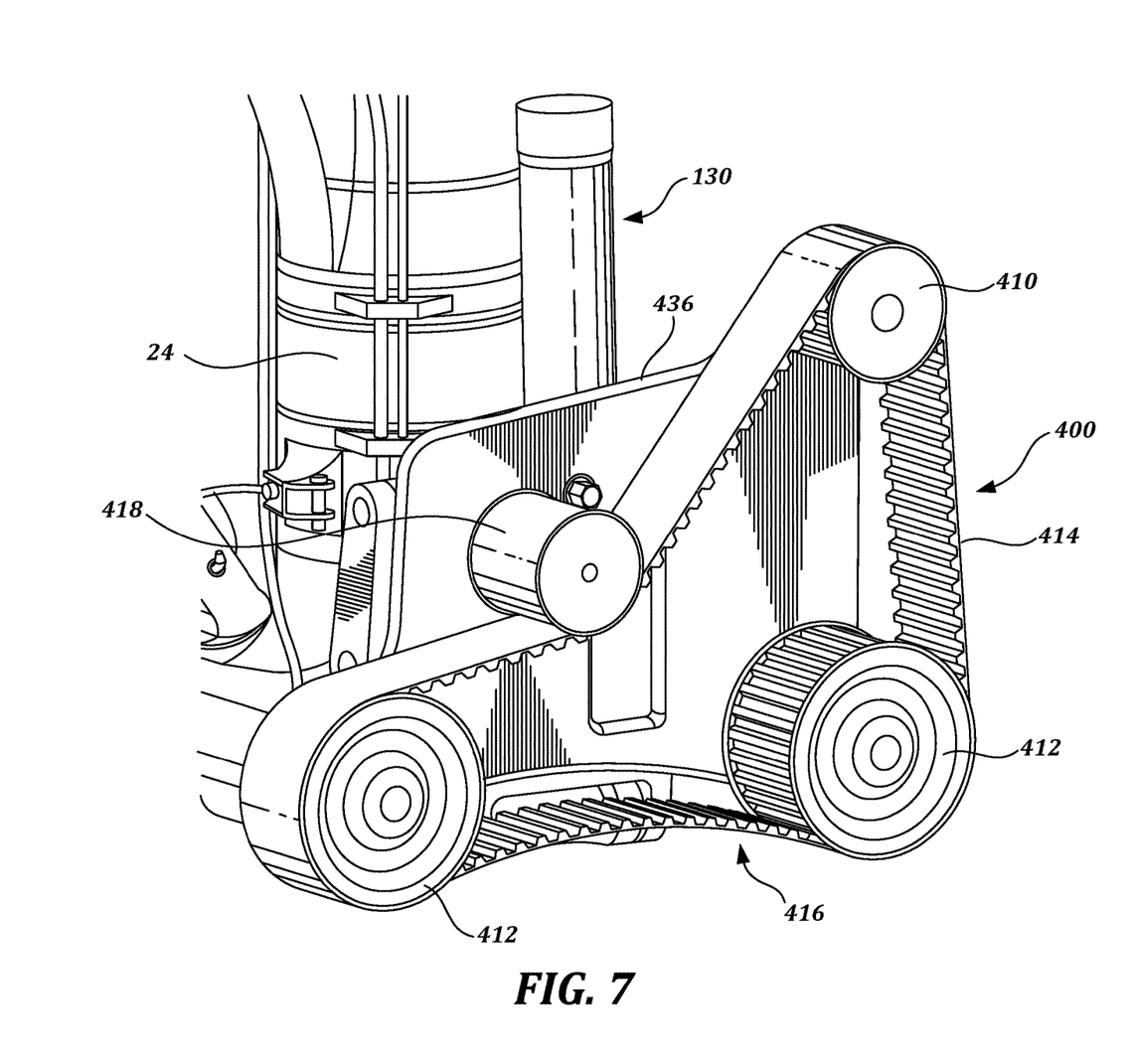
FIG. 7 is a front perspective view of the taxi drive system of FIG. 5 with the taxi drive system in the second or wheel-disengaged position.

When the taxi drive system 400 is in a first position, as shown in FIGS. 5 and 6, the exterior surface 420 of the track 416 of drive belt 414 is in frictional contact with the aircraft wheel tire 46 of the aircraft wheel. Thus, as the torque generated by the drive motor moves the track 416, the motion of the track 416 is transferred to the aircraft wheel, causing the aircraft to taxi. When the taxi drive system 400 is not being used to taxi the aircraft, the taxi drive system 400 can be moved to a second position, in which the taxi drive system 400, for example the track 116, is in a wheel-disengaged position, as shown in FIG. 7.

In the embodiment depicted in FIGS. 5-8, the pulleys 410, 412, 418 (optional) are mounted for rotational movement to a plate or carriage 436. As such, the taxi drive system 400 can move as a unit via the carriage 436 between the first, wheel-engaged position and the second, wheel-disengaged position.

In the embodiment shown, the drive pulley 410 and the first and second positioning pulleys 412 are mounted about fixed axes of rotation. For example, the drive pulley 410 and the first and second positioning pulleys 412 can be journaled about pins or shafts that are fixedly coupled to the carriage 436. The optional take-up pulley 418 or belt tensioner can be employed in some embodiments for applying tension to the track 416 and/or for shaping the track 416 around drive pulley 410 and/or one of the positioning pulleys 412 for slippage reduction purposed. In an embodiment, the take-up pulley 418 is movable with respect to the carriage 436 and is mounted on a spring-loaded pivot arm. Thus, the take-up pulley 418 can be of the self-adjusting or self-tensioning type. In other embodiments, the take-up pulley 418 can be manually adjusted, and can be positioned so as to apply a pre-tension force on the drive belt 414.

Figure 8:
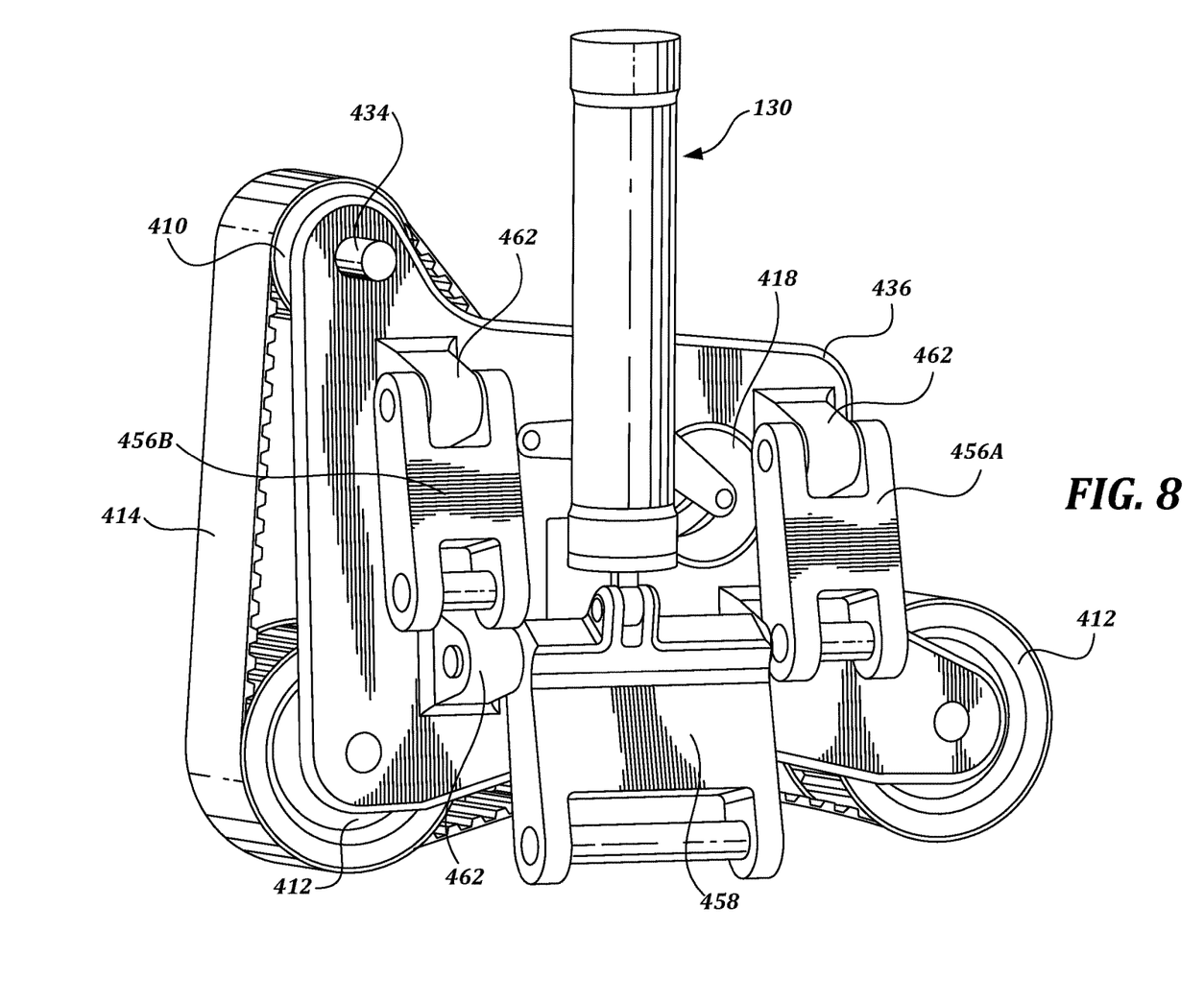
FIG. 8 is a rear perspective view of the taxi drive system of FIG. 5.

As was briefly described above, the taxi drive system 400 engages and disengages with the aircraft wheel as a unit. In that regard, the carriage 436, to which the drive pulley 410, the first and second positioning pulleys 412, and the optional take-up pulley 418 are mounted for rotational movement, is mechanically coupled to landing gear assembly 20 via a linkage, such as a 4 bar linkage, as shown in FIGS. 6 and 8. Of course, other linkage mechanisms as well as other arrangements can be utilized to provide a rotational and/or translational movement to the carriage for moving the taxi drive system 400 into and out of engagement with the aircraft wheel.

In the embodiment shown in FIGS. 6 and 8, the 4-bar linkage includes first and second upper links 456A, 456B and lower link 458 pinned or otherwise rotatably mounted at their inner ends to lugs 464, 468, respectively, which are fixedly coupled to or integrally formed on the landing gear leg 24. The outer ends of the links 456A, 456B and lower link 458 are pinned or otherwise rotatably mounted to mounting structure, such as lugs 462, fixedly coupled or integrally formed on the backside of the carriage 436.

An actuation system, such as actuator 130 coupled to energy source 134 (not shown in FIGS. 5-8), is provided to supply motive force to the carriage 436 in order to reciprocally move the track system 400 between first and second positions. In the embodiment shown, the actuator 130 includes a hydraulic cylinder coupled at one end to the landing gear leg 24, and a piston rod telescopingly mounted within the cylinder. The outer end of the piston rod is mounted to the carriage 436. In one embodiment, the piston rod is mounted to the outer end of the lower link 458 of the 4-bar linkage.

While embodiments of the system have been described herein as employing a drive belt, other configurations are possible, and are contemplated to be within the scope of the present disclosure. For example, in an embodiment, the taxi drive system may employ a drive chain instead of a drive belt. In some of these embodiments, the drive pulley, positioning pulleys, and optional take-up pulley(s) are replaced with cogwheels or sprockets. In one embodiment, a variable diameter drive cogwheel can be employed.

In one embodiment, the track formed by the drive chain engages with a driven cogwheel affixed to the hub 42 of the wheel 28. When the taxi drive system is engaged, the drive chain engages with the driven cogwheel so as to allow power to be transferred from the drive motor to the driven cogwheel via the drive chain, thereby allowing the aircraft to taxi. The taxi drive system may be moved between a first or engaged position, in which the drive chain is in contact with the driven cogwheel of the aircraft wheel, and a second or disengaged position, in which the drive chain is not in contact with the driven cogwheel of the aircraft wheel.

In another embodiment, the drive chain may include a platen affixed to the exterior surface (facing the aircraft wheel) of each chain link. In this embodiment, the platens are configured to contact the exterior surface of either the tire or the hub in a frictionally engaging manner. When the taxi drive system is engaged, the platens of the drive chain engage with the aircraft wheel so as to allow power to be transferred from the drive motor to the aircraft wheel (e.g., the tire, the hub, etc.), thereby allowing the aircraft to taxi. The taxi drive system may be moved between a first or engaged position, in which the drive chain is in contact with the aircraft wheel, and a second or disengaged position, in which the drive chain is not in contact with the aircraft wheel.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft landing gear comprising:
   a landing gear leg that includes a first end;
   an aircraft wheel rotatably mounted at the first end about an axis,
   a taxi drive system configured to apply a motive force to the aircraft wheel, the taxi drive system comprising
      a carriage movably mounted to the landing gear;
      a drive pulley carried by the carriage;
      first and second positioning pulleys carried by the carriage; and a drive belt disposed in tension between the drive pulley and the positioning pulleys to form a continuous track;

an actuator coupled between the landing gear leg and the carriage, the actuator configured to move the carriage between a first position, in which a segment of the continuous track is in engagement with the aircraft wheel, and a second position, in which the segment of the continuous track is removed from engagement with the aircraft wheel.

2. The aircraft landing gear of claim 1, wherein the landing gear leg includes an outer cylinder and a piston telescopically within the outer cylinder.

3. The aircraft landing gear of claim 2, wherein the taxi drive system is carried by the outer cylinder and the aircraft wheel is carried by the piston.

4. The aircraft landing gear of claim 2, wherein the taxi drive system and the aircraft wheel are carried by the piston.

5. The aircraft landing gear of claim 1, wherein the aircraft wheel includes a hub that supports an aircraft tire.

6. The aircraft landing gear of claim 5, wherein when carriage is in the first position, the segment of the continuous track is in engagement with the aircraft tire.

7. The aircraft landing gear of claim 5, wherein when carriage is in the first position, the segment of the continuous track is in engagement with the aircraft hub.

8. The aircraft landing gear of claim 5, wherein the drive belt includes a rubber material.

9. The aircraft landing gear of claim 5, wherein the drive belt includes substantially the same material as the aircraft tire.

10. The aircraft landing gear of claim 5, wherein the segment of the continuous track engages with the aircraft tire to form a circumferential contact patch, the circumferential contact patch extending approximately 5% and 40% of the circumference of the aircraft tire.

11. The aircraft landing gear of claim 5, wherein the circumferential contact patch extends approximately 15% of the circumference of the aircraft tire.

12. The aircraft landing gear of claim 10, wherein the drive belt has a width of approximately 40-100 mm.

13. The aircraft landing gear of claim 12, wherein the drive belt has a width of approximately 55-65 mm.

14. The aircraft landing gear of claim 1, wherein the taxi drive system further comprises a take-up pulley in contact with the drive belt.

15. The aircraft landing gear of claim 14, wherein the take-up pulley is a self-adjusting take-up pulley.

16. The aircraft landing gear of claim 14, wherein the drive pulley and the positioning pulleys are fixed with respect to carriage, and the take-up pulley is movable with respect to the carriage.

17. The aircraft landing gear of claim 1, wherein the carriage is movably mounted to the landing gear via a linkage mechanism.

18. The aircraft landing gear of claim 17, wherein the linkage mechanism forms a 4-bar linkage with the landing gear leg and carriage.

19. The aircraft landing gear of claim 18, where the actuator includes a linear actuator configured to hold the continuous track against the aircraft wheel.

* * * * *

UNITED STATES PATENT AND TRADEMARK OFFICE
CERTIFICATE OF CORRECTION

| | | Page 1 of 1 |
|---|---|---|
| PATENT NO. | : 11,407,502 B2 | |
| APPLICATION NO. | : 16/799361 | |
| DATED | : August 9, 2022 | |
| INVENTOR(S) | : R. Schmidt | |

It is certified that error appears in the above-identified patent and that said Letters Patent is hereby corrected as shown below:

In the Claims

| Column | Line | |
|---|---|---|
| 11 | 22 | change "when carriage" to -- when the carriage -- |
| 11 | 25 | change "when carriage" to -- when the carriage -- |
| 12 | 20 | change "to carriage" to -- to the carriage -- |
| 12 | 27 | change "and carriage" to -- and the carriage -- |

Signed and Sealed this
Sixteenth Day of July, 2024

Katherine Kelly Vidal
*Director of the United States Patent and Trademark Office*